(12) United States Patent
Nikolin et al.

(10) Patent No.: US 8,690,163 B2
(45) Date of Patent: Apr. 8, 2014

(54) GASKET STOP

(75) Inventors: Przemyslaw Krzysztof Nikolin, Berkshire (GB); William Keith Albert Eyers, Surrey (GB)

(73) Assignee: BHA Altair, LLC, Franklin, TN (US)

( * ) Notice: Subject to any disclaimer, the term of this patent is extended or adjusted under 35 U.S.C. 154(b) by 897 days.

(21) Appl. No.: 12/862,732

(22) Filed: Aug. 24, 2010

(65) Prior Publication Data

US 2012/0049466 A1  Mar. 1, 2012

(51) Int. Cl.
*F16J 3/00* (2006.01)
(52) U.S. Cl.
USPC ............................ 277/637; 277/628; 277/630
(58) Field of Classification Search
USPC .......................................... 277/628, 630, 637
See application file for complete search history.

(56) References Cited

U.S. PATENT DOCUMENTS

| 5,904,357 | A * | 5/1999 | Demirdogen et al. | 277/630 |
| 6,708,979 | B2 * | 3/2004 | Stratman et al. | 277/316 |
| 2001/0054799 | A1 * | 12/2001 | McComb | 277/590 |
| 2004/0164498 | A1 * | 8/2004 | Stratman et al. | 277/628 |

* cited by examiner

*Primary Examiner* — Gilbert Lee
(74) *Attorney, Agent, or Firm* — Reinhart Boerner Van Deuren P.C.

(57) ABSTRACT

A gasket stop and gasket housing apparatus are provided. In one embodiment, the invention provides a gasket stop comprising: a body having: a first surface; and a second surface spaced from and substantially parallel to the first surface; an opening extending from the first surface to the second surface; at least one pillar extending at an acute angle from the first surface; and at least one retaining device having: an upright portion with at least one face; and a projecting portion extending outwardly from the body beyond the at least one face of the upright portion, whereby the at least one pillar and the at least one retaining device pass through a slot in a member such that the projecting portion secures the gasket stop against the member.

16 Claims, 6 Drawing Sheets

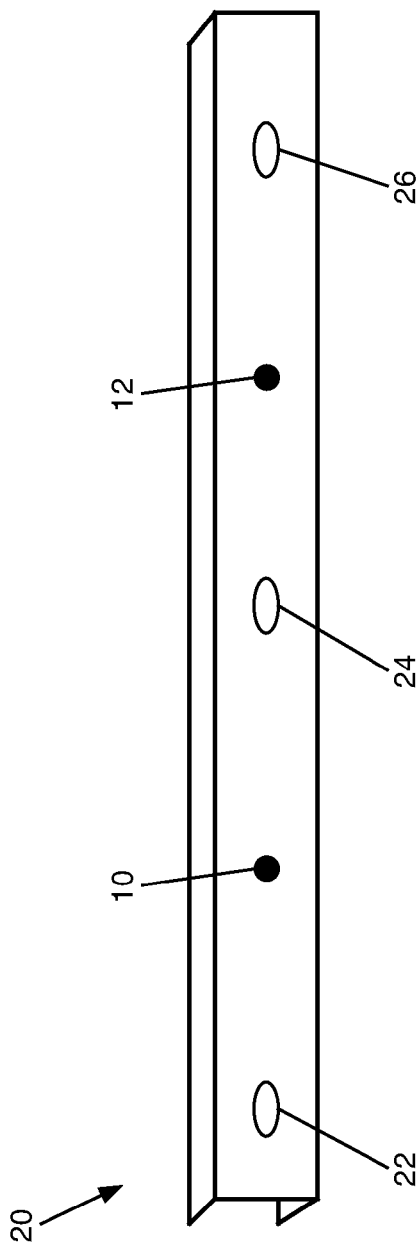
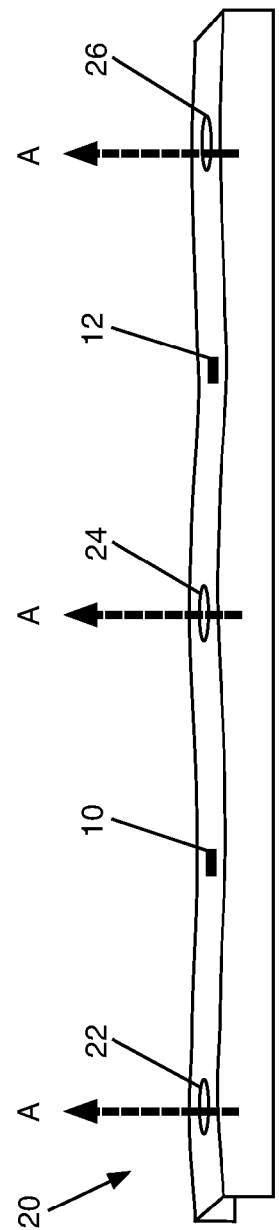

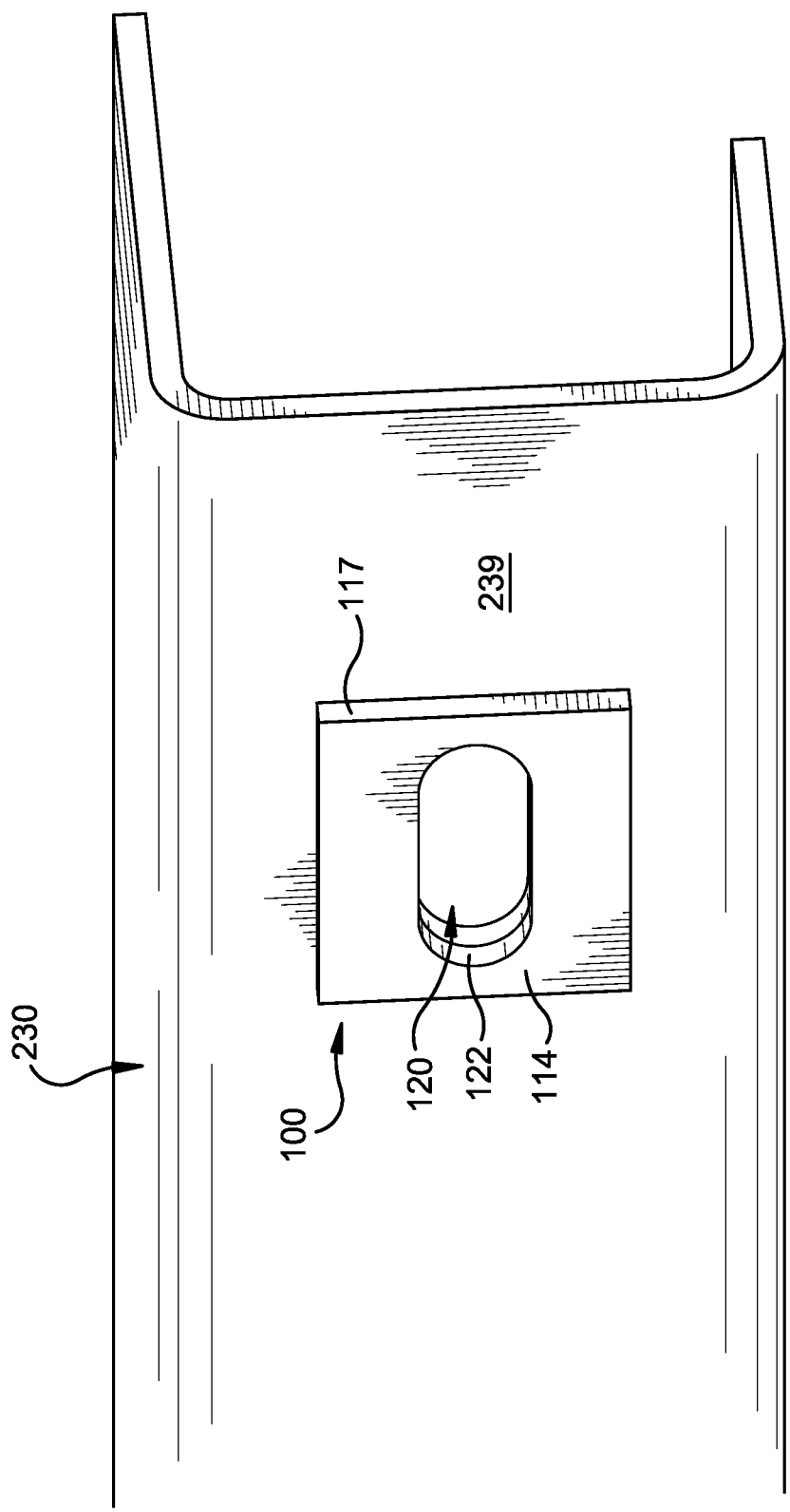

GASKET STOP

BACKGROUND OF THE INVENTION

Embodiments of the invention relate generally to gaskets and, more particularly, to a gasket stop for attachment to a bolt hole of a gasket frame, such as a filter house frame.

Various machines and devices, including gas and steam turbines, employ gaskets and gasket frames for sealing components of the machine or device. Typically, gaskets are housed within some manner of the gasket frame, which secures the gasket in place within the machine or device. A rail 20 of a conventional gasket frame is shown in FIG. 1. As can be seen, bolt holes 22, 24, 26 are located along rail 20. A pair of rails will generally be placed along either side of a gasket and secured together by passing a bolt through each bolt hole 22, 24, 26, thereby securing the gasket between the rails. The gasket frame itself may be of any shape and therefore include any number of rails of various sizes and shapes, as will be recognized by one skilled in the art. For ease of description, only a single elongate rail 20 is shown.

In order to avoid overcompression of a gasket secured between a pair of rails 20, known gasket frames often employ gasket stops 10, 12 between bolt holes 22, 24, 26. Typically, such gasket stops 10, 12 comprise metal discs welded along a surface of rail 20. When a gasket is placed between a pair of rails 20, which are then secured with bolts through bolt holes 22, 24, 26, gasket stops 10, 12 prevent over-compression of the gasket as the bolts are tightened. Avoidance of compression of a gasket beyond its design compression limit is critical to obtaining and maintaining the desired seal.

However, the bolts securing the pair of rails 20 are often not tightened using a torque wrench or other device for applying a measured pressure. As a consequence, the bolts tend to be overtightened, resulting in bending or deflection of rail 20, as shown in FIG. 2. Portions of rail 20 adjacent bolt holes 22, 24, 26 are deflected along path A, toward the second of the pair of rails (not shown), as the bolts are tightened.

Typically, gasket frames will include hundreds of bolt holes and gasket stops, resulting in extensive and uneven bowing of the frame's rails 20. As a consequence, compression of the gasket is uneven along its length, resulting in a less efficient seal, an incomplete seal, or in some cases, a seal failure, any of which may damage or destroy the machine or device in which it is contained.

BRIEF DESCRIPTION OF THE INVENTION

A gasket stop and gasket housing apparatus are provided.

In one embodiment, the invention provides a gasket stop comprising: a body having: a first surface; and a second surface spaced from and substantially parallel to the first surface; an opening extending from the first surface to the second surface; at least one pillar extending at an acute angle from the first surface; and at least one retaining device having: an upright portion with at least one face; and a projecting portion extending outwardly from the body beyond the at least one face of the upright portion, whereby the at least one pillar and the at least one retaining device pass through a slot in a member such that the projecting portion secures the gasket stop against the member.

In another embodiment, the invention provides a gasket housing apparatus comprising: a first frame including at least one rail, the at least one rail having at least one bolt hole and at least one slot therethrough; a second frame including at least one rail, the at least one rail having at least one bolt hole therethrough; a gasket stop comprising: a body having: a first surface; and a second surface spaced from and substantially parallel to the first surface; an opening extending from the first surface to the second surface; at least one pillar extending at an acute angle from the first surface; and at least one retaining device having: an upright portion with at least one face; and a projecting portion extending outwardly from the body beyond the at least one face of the upright portion, wherein the at least one pillar and the at least one retaining device are adapted to pass through the at least one slot of the first frame.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIGS. 1 and 2 show perspective views of a known gasket frame rail.

FIGS. 8 and 9 show perspective views of the gasket stop of FIGS. 3 and 4 in conjunction with a gasket frame rail.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 3:
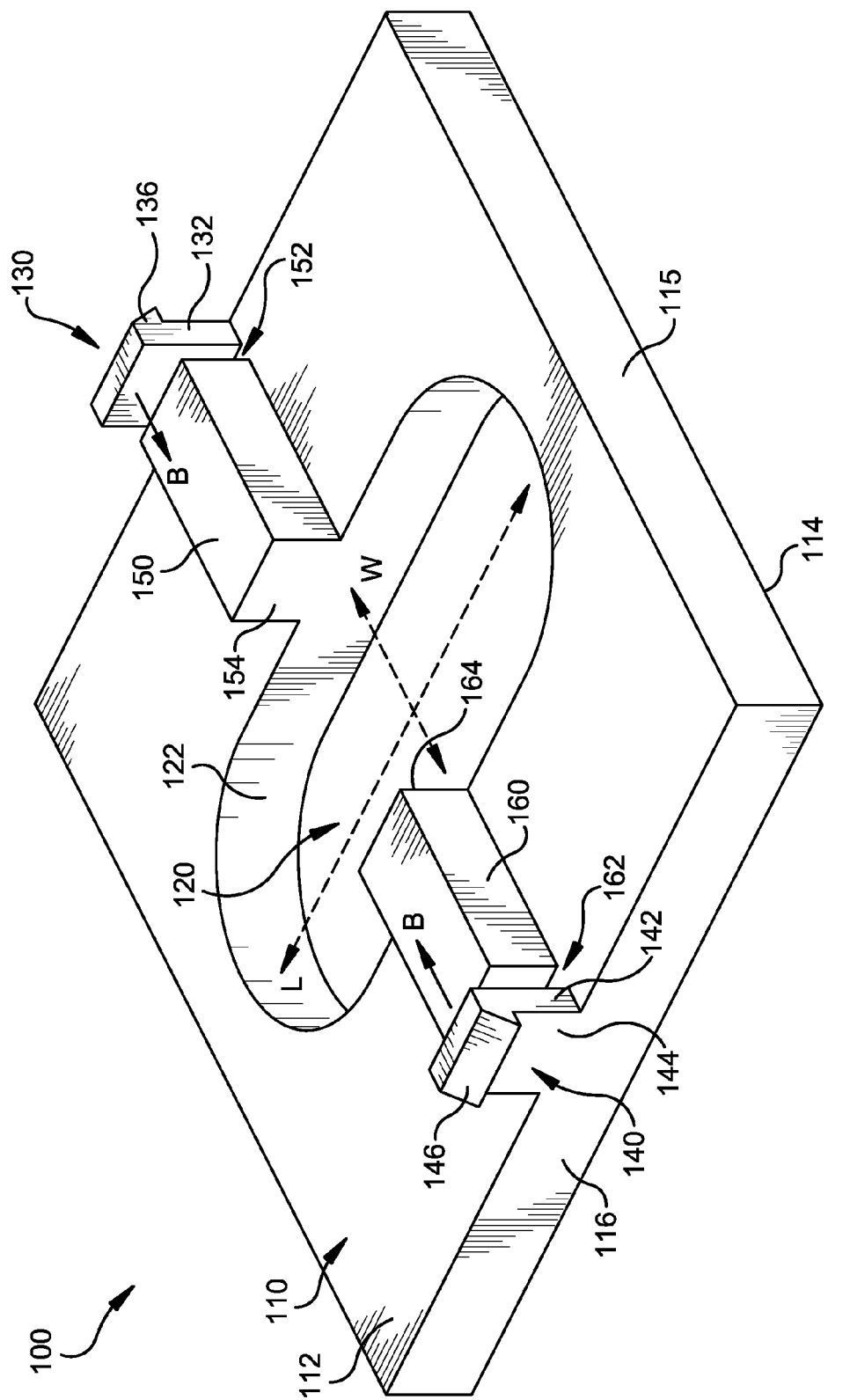
FIGS. 3 and 4 show perspective views of a gasket stop according to an embodiment of the invention.
Figure 4:
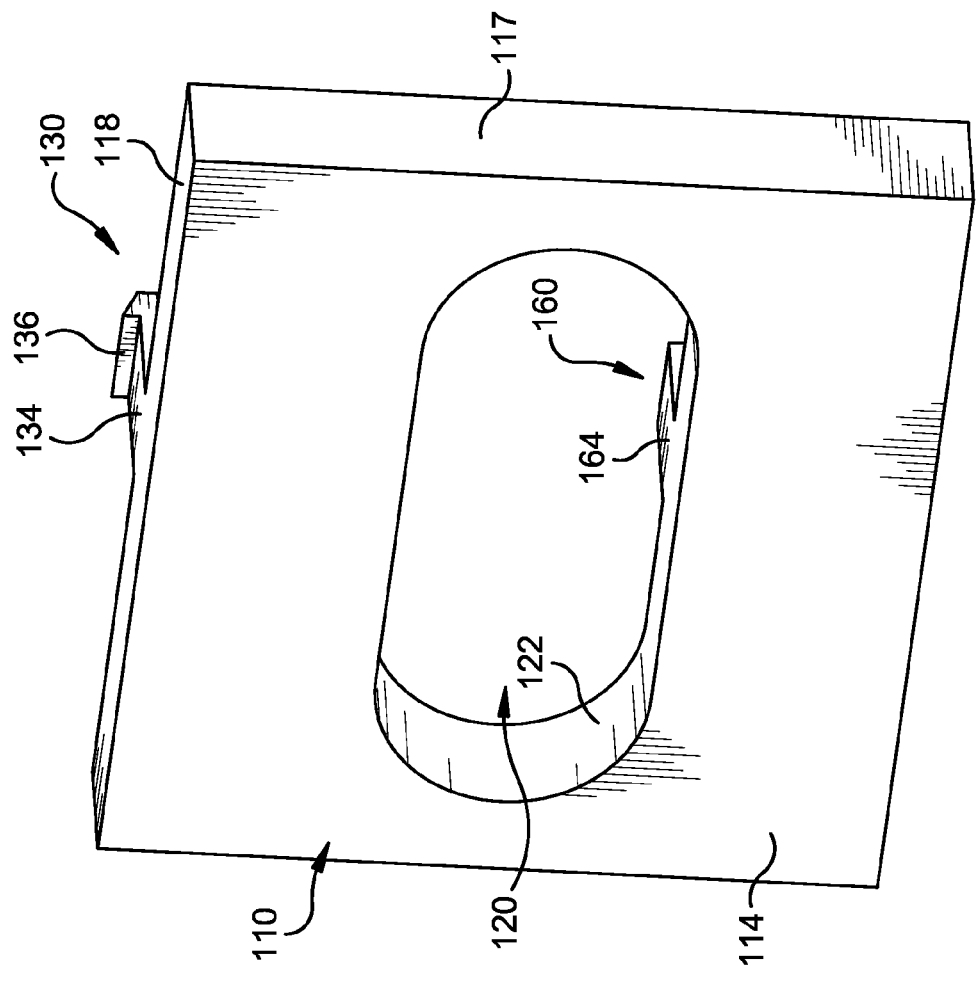

Referring now to FIGS. 3 and 4, perspective views of a gasket stop 100 according to an embodiment of the invention are shown. Gasket stop 100 includes a body 110 having a first surface 112 and a second surface 114 spaced from and substantially parallel to first surface 112. At least one edge 116 is disposed between first surface 112 and second surface 114. The number of edges between first surface 112 and second surface 114 may vary, of course, depending on the shape of gasket stop 100. In FIGS. 3 and 4, gasket stop 100 is shown with a first surface 112 having a substantially square periphery and a similarly shaped second surface 114 spaced from and extending substantially parallel thereto. As a consequence, gasket stop 100 includes four edges 115, 116, 117 (shown only in FIG. 4), 118 (shown only in FIG. 4) between first surface 112 and second surface 114. Other arrangements are possible, of course, as will be recognized by one skilled in the art.

An opening 120 passes through body 110, i.e., from first surface 112 through second surface 114. As shown in FIGS. 3 and 4, opening 120 has a rounded oblong shape, having a length L and a width W, the length L being substantially perpendicular to and greater than the width W. Opening 120 forms a continuous surface 122 within body 110. Opening 120 may have other shapes, however, as will be described in more detail below.

First surface 112 is shown having a pair of pillars 150, 160 extending at an acute angle therefrom. Pillars 150, 160 are shown adjacent opening 120, although this is not essential. As will be described in greater detail below, pillars 150, 160 serve as a mating feature with an opening in a member, such as a gasket frame. That is, pillars 150, 160 are of a size and shape such that they may fit within an opening in the member. As such, pillars 150, 160 may have a different shape than that shown in FIGS. 3 and 4, as long as the shape permits entry into the opening in the member. Pillars 150, 160 include a face 154, 164, respectively, substantially co-planar with at least a portion of continuous surface 122.

First surface 112 also includes a pair of retaining devices 130, 140 adjacent pillars 150, 160, but separated therefrom by voids 152, 162, respectively. Retaining devices 130, 140 include an upright portion 132, 142 and a projecting portion 136, 146. Upright portions 132, 142 each include a face 134 (shown only in FIG. 4), 144 substantially co-planar with edges 118 (shown only in FIG. 4) and 116, respectively. Projecting portions 136, 146 extend outwardly from body 110 and beyond faces 134, 144 and edges 118, 116. As shown in FIGS. 3 and 4, projecting portions 136, 146 have a substantially triangular shape in cross-section, although this is not essential. Other shapes are possible and both the sizes and shapes of projecting portions 136, 146 will vary depending on, for example, the size and shape of the opening in the member, into which it will be passed.

As will be described in greater detail below, insertion of retaining devices 130, 140 into a slot (233 in FIG. 6, infra) in a rail (230 in FIG. 6, infra) of a member, such as a gasket frame, will typically require, due to the extension of projecting portions 136, 146 beyond faces 134, 144 and edges 118, 116, deflection of at least a portion of retaining devices 130, 140 along path B, i.e., away from edges 118, 116 and toward voids 152, 162. As such, at least a portion of retaining devices 130, 140 are deformable along path B. Such deformation may be permanent or non-permanent.

Gasket stop 100 may comprise any number of materials or combinations of materials. Its use as a gasket stop requires some degree of rigidity, while deflection of some portion of retaining devices 130, 140 requires some degree of flexibility. Suitable materials include, for example, solid nylon (e.g., type 6,6, nylon 101, Nylon 6), other polyamides such as aramids, and polyethylenes. In some embodiments of the invention, gasket stop 100 comprises a single material. In other embodiments of the invention, gasket stop 100 comprises a combination of materials (e.g., retaining devices 130, 140 comprise a less rigid, more flexible material while the remainder of gasket stop 100 comprises a more rigid, less flexible material).

Figure 5:
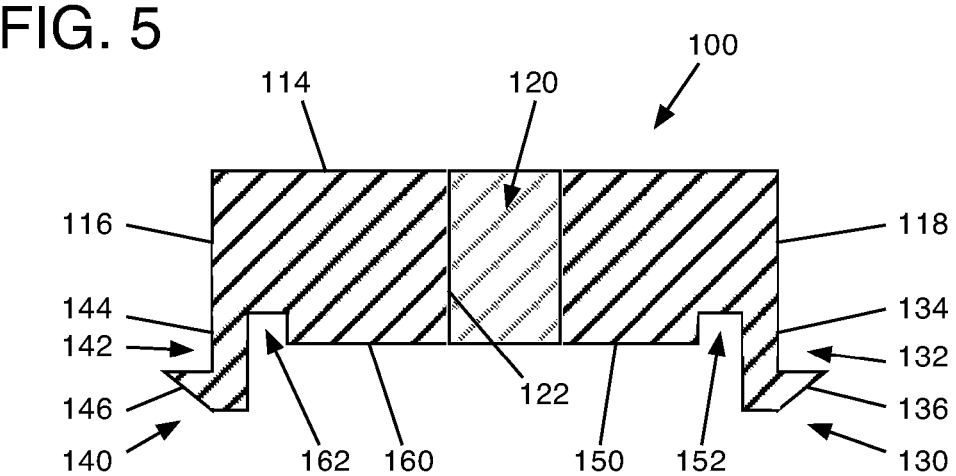
FIG. 5 shows a cross-sectional side view of the gasket stop of FIGS. 3 and 4.
Figure 6:
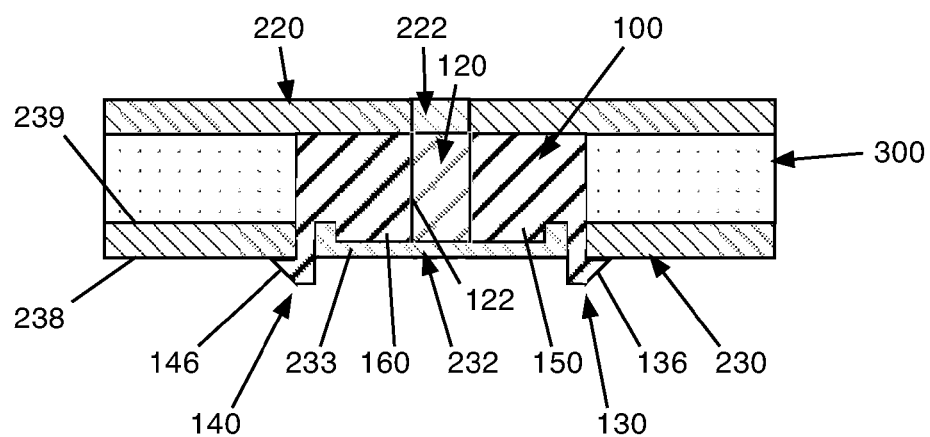
FIGS. 6 and 7 show cross-sectional side views of the gasket stop of FIG. 5 in conjunction with gasket frame rails.

FIG. 5 shows a cross-sectional side view of gasket stop 100 along width W (FIG. 3). FIG. 6 shows the gasket stop 100 of FIG. 5 between a pair of gasket frame rails 220, 230 and adjacent a gasket 300. As can be seen in FIG. 6, pillars 150, 160 of gasket stop 100 sit below an inner surface 239 and within a slot 233 of bottom rail 230. In the embodiment of FIG. 6, slot 233 is oblong, such that retaining devices 130, 140 and pillars 150, 160 pass through slot 233 to an extent that projecting portions 136, 146 reside along or below outer surface 238 of bottom rail 230. Projecting portions 136, 146 thereby retain gasket stop 100 within bottom rail 230.

Figure 7:
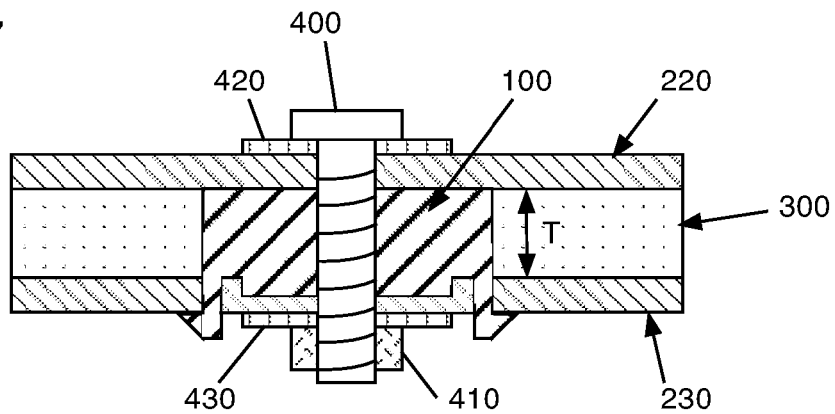

Opening 120 of gasket stop 100 and bolt holes 222, 232 of top rail 220 and bottom rail 230, respectively, form a path through which a bolt or similar fastening device may be passed, as shown in FIG. 7. Bolt 400, nut 410, and washers 420, 430 secure top rail 220 to bottom rail 230, with gasket 300 and gasket stop 100 therebetween. Washer 430 is wider than a width but narrower than a length of oblong slot 233, such that washer 430 may reside against outer surface 238 of bottom rail 230 without hindering passage of projecting portions 136, 146 through slot 233.

The rigidity of gasket stop 100 prevents overtightening of bolt 400 and any consequent compression of gasket 300 beyond its design compression limit. The thickness T of gasket stop 100 may be varied based on the maximum compression of gasket 300 desired.

Figure 8:
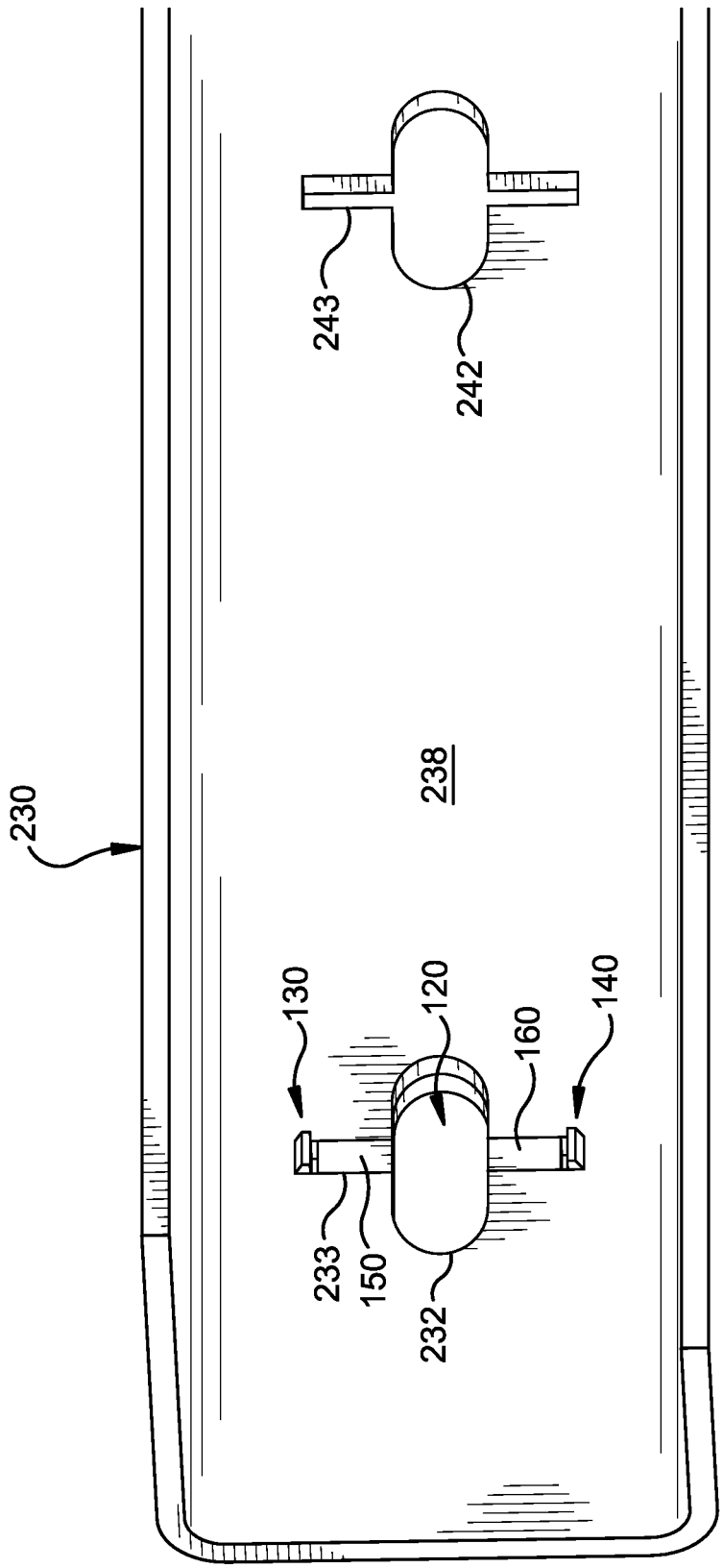

FIGS. 8 and 9 show perspective views of bottom rail 230 with gasket stop 100 in place. In FIG. 8, which shows outer surface 238 of bottom rail 230, retaining devices 130, 140 and pillars 150, 160 of gasket stop 100 can be seen within slot 233. A second bolt hole 242 and slot 243 are also shown, without a gasket stop in place, to better illustrate their structure in the depicted embodiment. FIG. 9 shows inner surface 239 of bottom rail, with gasket stop 100 in place. As noted above, the size and shape of slot 233 may be different than that depicted. Various sizes and shapes may be employed, with the sizes and shapes of pillars 150, 160 and retaining devices 130, 140 varied in kind.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gasket stop comprising:
   a body having:
      a first surface; and
      a second surface spaced from and substantially parallel to the first surface;
   an opening extending from the first surface to the second surface, the opening forming a continuous surface along an interior of the body substantially perpendicular to both the first surface and the second surface;
   at least one pillar adjacent the opening and extending at an acute angle from the first surface, the at least one pillar having a face substantially co-planar with at least a portion of the continuous surface of the opening;
   at least one retaining device extending at an acute angle from the first surface, the at least one retaining device having:
      an upright portion with at least one face; and
      a projecting portion extending outwardly from the body beyond the at least one face of the upright portion; and
   a void between the at least one pillar and the at least one retaining device,
   whereby the at least one pillar and the at least one retaining device pass through a slot in a member such that the projecting portion secures the gasket stop against the member.

2. The gasket stop of claim 1, wherein the body further includes at least one edge between the first surface and the second surface, and at least one face of the upright portion is substantially co-planar with the at least one edge of the body and the projecting portion extends beyond the at least one edge of the body.

3. The gasket stop of claim 1, wherein the opening is oblong, having a length and a width substantially perpendicular to the length, the length being greater than the width.

4. The gasket stop of claim 3, wherein the at least one pillar includes a first pillar adjacent a first side of the opening and a second pillar adjacent a second side of the opening, the first pillar and the second pillar being oriented substantially parallel to the width of the opening.

5. The gasket stop of claim 1, wherein the at least one edge includes a first edge and a second edge between the first surface and the second surface, wherein the first edge is substantially parallel to the second edge.

6. The gasket stop of claim 5, wherein the at least one retaining device includes:
   a first retaining device having an upright portion with a face substantially co-planar with the first edge; and
   a second retaining device having an upright portion with a face substantially co-planar with the second edge.

7. The gasket stop of claim 1, wherein at least a portion of the at least one retaining device is deformable toward the at least one void.

8. The gasket stop of claim 7, wherein the at least a portion of the at least one retaining device is permanently deformable.

9. The gasket stop of claim 7, wherein the at least a portion of the at least one retaining device is non-permanently deformable.

10. A gasket housing apparatus comprising:
    a first frame including at least one rail, the at least one rail having at least one bolt hole and at least one slot therethrough;
    a second frame including at least one rail, the at least one rail having at least one bolt hole therethrough;
    a gasket stop comprising;
        a body having:
            a first surface; and
            a second surface spaced from and substantially parallel to the first surface;
        an opening extending from the first surface to the second surface, the opening forming a continuous surface along an interior of the body substantially perpendicular to both the first surface and the second surface;
        at least one pillar adjacent the opening and extending at an acute angle from the first surface, the at least one pillar having a face substantially co-planar with at least a portion of the continuous surface of the opening;
        at least one retaining device extending at an acute angle from the first surface, the at least one retaining device having:
            an upright portion with at least one face; and
            a projecting portion extending outwardly from the body beyond the at least one face of the upright portion; and
        a void between the at least one pillar and the at least one retaining device,
    wherein the at least one pillar and the at least one retaining device are adapted to pass through the at least one slot of the first frame.

11. The gasket housing apparatus of claim 10, wherein the body further includes at least one edge between the first surface and the second surface, and at least one face of the upright portion is substantially co-planar with the at least one edge of the body and the projecting portion extends beyond the at least one edge of the body.

12. The gasket housing apparatus of claim 10, wherein the at least one slot passes through the at least one bolt hole.

13. The gasket housing apparatus of claim 10, wherein the at least one pillar includes a first pillar adjacent a first side of the opening and a second pillar adjacent a second side of the opening, the first pillar and second pillar being sized to fit within the slot.

14. The gasket housing apparatus of claim 10, wherein the upright portion of the at least one retaining device is sized to pass through the at least one slot such that the projecting portion of the at least one retaining device resides on a surface of the at least one rail of the first frame.

15. The gasket housing apparatus of claim 10, wherein the opening of the gasket stop is oblong, having a length and a width substantially perpendicular to the length, the length being greater than the width.

16. The gasket housing apparatus of claim 10, wherein at least a portion of the at bast one retaining device is deformable toward the at least one void.

* * * * *